Patented Dec. 7, 1926.

1,610,035

UNITED STATES PATENT OFFICE.

GEORG BREDIG AND EGON ELÖD, OF KARLSRUHE, GERMANY, ASSIGNORS TO THE FIRM OF RUDOLPH KOEPP & CO., OF OESTRICH-ON-THE-RHINE, GERMANY, A SOCIETY ORGANIZED UNDER LAWS OF GERMANY.

PROCESS FOR THE PRODUCTION OF HYDROCYANIC ACID.

No Drawing. Original application filed January 28, 1924, Serial No. 689,156, and in Germany December 7, 1922. Divided and this application filed November 21, 1924. Serial No. 751,373.

Various methods for the production of hydrocyanic acid have become known which are based upon the passing of volatile or gaseous nitrogen compounds e. g. ammonia and carbon monoxide at higher temperatures over substances possessing a catalytic effect.

According to the present invention which is a divisional application of No. 689,156 filed January 28th, 1924, compounds of elements of the vanadium group of the periodic system especially of vanadium itself are used as catalysts for this process. The application of these catalysts presents the advantage that the formation of hydrocyanic acid may be greatly accelerated. Furthermore the undesirable decomposition of the ammonia which frequently occurred with the process hitherto known, will be avoided as far as possible.

The above mentioned catalysts, for instance compounds of vanadium, may be used alone or mixed with one another or also mixed with other catalysts, for instance compounds of the rare earths or carbides or silicides. The carbides for instance may also be preferably in such a way that they serve as carriers for the catalytic substances, for instance compounds of vanadium. It will be possible, for instance, to bring into the carbides the oxide of vanadium or the like or a mixture of vanadium compounds.

The production of the hydrocyanic acid with the aid of the above mentioned catalysts can be carried out e. g. in the commonly used manner, for instance by passing the mixtures of ammonia and carbon monoxide over the catalysts at convenient temperature.

Especially good results are obtained by working with considerable excess of carbon monoxide or substances containing the same e. g. generator gas, gas from coking or the like and in avoiding too high temperatures. Especially good outputs in hydrocyanic acid calculated with respect to the quantity of ammonia employed, were obtained e. g. with a proportion of approximately 5 vol. parts of carbon monoxide to 1 vol. part of ammonia.

It has further been found that by a considerable addition of hydrogen or substances containing this gas, that is more than 1 part by volume of hydrogen to one part by volume of ammonia, the yield may be improved in the mentioned process. The hydrogen or the substances containing hydrogen, as for instance water gas or gases and vapours from molasses-waste and the like, act as protecting gases in such a way that the decomposition of ammonia, even under ordinary pressure, is reduced considerably more than when working only with an excess of carbonic oxide gas.

The height of temperature depends on the quality of the catalysts, on the kind of reaction gas and diluting means, the concentration of the gaseous nitrogen compounds and on the velocity of flow of the gases. It is generally advisable to select temperatures between 400° and 800° C. Temperatures between 500 and 600° C. are especially advantageous.

When working according to the invention it is possible to convert the nitrogen compounds used almost quantitatively into hydrocyanic acid. Further advantages consist in the possibility of working also moist gases so that the process of preliminary drying the same is superseded. It is not necessary that the gas be especially pure.

On account of the knowledge of the perniciousness of iron it is advisable to avoid iron and iron compounds especially also an iron apparatus. The apparatus may preferably consist, for instance, of copper, or of ceramic material.

Examples.

1. 40 cubic meters of carbon monoxide and 20 cubic meters of ammonia per hour are conducted through a pipe at 550° C., this pipe containing as catalyst vanadium oxide precipitated on clay slabs for example. Approximately 3.7 kg. of hydrocyanic acid will be obtained per hour and besides about 12 cubic meters of ammonia gas which, after the separation of the hydrocyanic acid, can be returned to the process.

2. 40 cubic meters of carbonic oxide and 20 cubic meters of ammonia per hour are made to pass at 550° C. over a catalyst consisting of vanadium oxide spread on carborundum. About 4.8 kg. of hydrocyanic acid and besides about 11.6 cubic meters of unaltered ammonia are obtained per hour.

3. 200 cubic meters of water gas and 20 cubic meters of ammonia per hour are passed at 600° C. over vanadium oxide spread on carborundum as carrier. The output will be per hour about 6 kg. of hydrocyanic acid and about 13.3 cubic meters of unaltered ammonia.

What we claim is:—

1. A process for the production of hydrocyanic acid, by causing ammonia and carbon monoxide to react in a heated condition, in the presence of vanadium oxide.

2. A process for the production of hydrocyanic acid, by causing ammonia and carbon monoxide to react in a heated condition, in the presence of a catalyst comprising vanadium oxide and other metallic oxides.

3. A process for the production of hydrocyanic acid, by causing ammonia and carbon monoxide to react in a heated condition, in the presence of a catalyst comprising vanadium oxide and oxides of the rare earth metals.

4. A process for the production of hydrocyanic acid, by causing ammonia and carbon monoxide to react in a heated condition, in the presence of a catalyst comprising vanadium oxide and cerium oxide.

5. A process for the production of hydrocyanic acid, by causing ammonia and carbon monoxide to react, the latter being used in excess, in a heated condition, in the presence of vanadium oxide as catalyst.

6. A process for the production of hydrocyanic acid, by causing ammonia and carbon monoxide to react, in a heated condition in the presence of more than 2 parts of hydrogen to 1 part of ammonia and in the presence of vanadium oxide as catalyst.

7. A process for the production of hydrocyanic acid, by causing ammonia and carbon monoxide to react, the latter being used in considerable excess, in a heated condition, in the presence of vanadium oxide, and in the presence of more than 2 parts of hydrogen to 1 of ammonia.

8. A process for the production of hydrocyanic acid by causing ammonia and carbon monoxide to react in a heated condition in the presence of contact substances containing "vanadium oxide".

In testimony whereof we affix our signatures.

GEORG BREDIG.
EGON ELÖD.